United States Patent [19]

Martin

[11] 4,391,770

[45] Jul. 5, 1983

[54] PROCESS FOR SPINNING AMINO-FORMALDEHYDE FIBERS

[75] Inventor: Graham E. Martin, Middlesbrough, England

[73] Assignee: Imperial Chemical Industries PLC, London, England

[21] Appl. No.: 322,291

[22] Filed: Nov. 17, 1981

[30] Foreign Application Priority Data

Dec. 1, 1980 [GB] United Kingdom ............... 8038537

[51] Int. Cl.³ .............................................. B29C 25/00
[52] U.S. Cl. ...................................... 264/236; 264/8; 264/347
[58] Field of Search ............... 525/509; 528/236, 238, 528/243, 233; 264/176 F, 8, 236, 347

[56] References Cited

U.S. PATENT DOCUMENTS

| 1,791,062 | 2/1931 | Luther et al. .................... 528/243 |
| 2,088,227 | 1/1937 | Battye et al. ..................... 525/509 |
| 2,193,630 | 3/1940 | Howald ............................. 528/243 |
| 2,219,375 | 10/1940 | Widmer et al. .................. 528/243 |
| 4,178,336 | 12/1979 | Snowden ............................ 264/8 |
| 4,202,959 | 5/1980 | Henbest et al. .................. 528/254 |
| 4,323,524 | 4/1982 | Snowden ............................ 264/8 |

FOREIGN PATENT DOCUMENTS

| 49-99191 | 9/1974 | Japan . |
| 85670 | 10/1976 | Poland . |
| 284802 | 12/1952 | Switzerland . |
| 300907 | 11/1954 | Switzerland . |
| 551404 | 2/1943 | United Kingdom . |
| 1420838 | 1/1976 | United Kingdom . |

*Primary Examiner*—Jay H. Woo
*Attorney, Agent, or Firm*—Cushman, Darby & Cushman

[57] ABSTRACT

Shaped articles of amino-formaldehyde resins having reduced released formaldehyde emission are made using a curing catalyst mixture of a volatile acid (or salt thereof) and a small amount of a non-volatile acid (or salt thereof).

8 Claims, No Drawings

PROCESS FOR SPINNING AMINO-FORMALDEHYDE FIBERS

This invention relates to shaped articles formed from amino-formaldehyde resins, and in particular to shaped articles having a relatively high surface area, such as fibres, films, and open celled foams.

Such articles may be made by forming a solution of the resin, to which a curing catalyst has been added, into the desired shape, generally with removal of water to dry and physically stabilise the resin in that shape, followed by heating to a temperature between 100° C. and 300° C., preferably to above 130° C., to cure the resin.

Even when amino-formaldehyde resins are highly cured there is a tendency for formaldehyde to be evolved over a period of time. Since formaldehyde is toxic, it is desirable, particularly with high surface area articles, e.g. those having a surface area in excess of 1 $m^2g^{-1}$, that the amount of formaldehyde emitted is as low as possible. Formaldehyde can be emitted in two ways. Firstly formaldehyde that is not reacted to form cross-links in the resin may be evolved. This is herein referred to as free formaldehyde. This free formaldehyde can be minimised by reducing the molar ratio of formaldehyde to amino compound. Also it can be removed during processing of the article, e.g. by heating. In addition to free formaldehyde, formaldehyde may be evolved from the resin over a period of time. This is thought to be a result of reversal of the condensation reaction forming the cured resin. It is thought that the condensation reaction is to some extent reversible, especially in the presence of water. The formaldehyde evolved over a period of time is herein referred to as released formaldehyde.

The condensation reaction, and the reverse thereof, is catalysed by various acidic materials, or by salts, such as ammonium salts, that release acids upon heating. We have found that if the curing catalyst employed in the production of the cured resin article is a volatile acid, or a salt of such a volatile acid, then the catalyst may be volatilised and removed during the resin curing step. By volatilisation and removal of the catyst during curing, the resin may be cured but freed of catalyst residues that would catalyse the reverse of the condensation reaction: hence the amount of released formaldehyde may be reduced.

By the term volatile acid we mean an acid that volatilises or decomposes at temperatures below the curing temperature, and preferably at below 120° C. Formic and acetic acids are such volatile acids and are conveniently employed as the ammonium salts. While hydrochloric acid is likewise volatile, chlorine containing materials are preferably not used as curing catalysts because of the risk of the formation of toxic and/or carcinogenic compounds such as bischloromethyl ether by reaction of the chloride containing material with formaldehyde.

To reduce the free formaldehyde it is also desirable to cure the resin to as high a degree as possible, generally to above 92%, and preferably to above 96%. In the present specification the degree of cure may conveniently be assessed by determining the proportion of fibre dissolved in water under specified conditions. A suitable procedure is to accurately weigh a sample, approx 5 g, of the dry fibre and digest the sample with 200 ml of water for 2 hours at 50° C. The undissolved fibre is recovered by filtration, dried in air at 100° C. for 2 hours and weighed. The degree of cure is defined as the ratio of the recovered fibre to the original sample weight.

Catalysts such as ammonium formate do not give as high a degree of cure as is desirable in many cases and/or the time required to achieve such a degree of cure is often uneconomically long. Because of the volatility of the catalyst, little advantage is obtained by the use of higher curing temperatures.

We have found that the degree of cure may be increased and/or higher curing temperatures effectively employed if the volatile catalyst is used in admixture with a small amount of a second catalyst.

Accordingly we provide a process for the production of shaped articles from amino-formaldehyde resins in which the shaped article is formed from a solution of the resin and is cured by heating to a temperature between 100° C. and 300° C. characterised in that the resin solution contains a catalyst mixture comprising 0.2 to 5% by weight, based on the resin solids, of an acid that volatilises or decomposes at a temperature below said curing temperature or an acid releasing salt thereof, and from 10 to 50% by weight, based on the weight of said acid or salt thereof, of a non-volatile acid or salt thereof. Preferably the amount of the volatile acid or salt is less than 2% by weight based on the resin solids. The amount of non-volatile acid or salt thereof is preferably at least 0.2% by weight of the resin solids.

The total amount of catalyst employed is preferably kept to the minimum consistent with attainment of the desired degree, and rate, of curing. In addition to increasing the cost, the use of larger amounts of catalyst will tend to give higher released formaldehyde contents.

The non-volatile catalyst may be any of the catalysts conventionally used for curing amino-formaldehyde resins, e.g. fast acting catalysts such as ammonium salts of sulphuric, sulphamic, phosphoric, and nitric acids, or the slow-acting catalysts such as some of the water soluble salts of metals such as zinc, magnesium, calcium, or aluminium with acids such as nitric, sulphuric, or phosphoric acids. Zinc or ammonium nitrates are particularly suitable as the non-volatile catalyst.

During the production of the shaped articles, the articles are dried, normally by application of heat, to physically stabilise the resin into the desired shape. During this drying process some curing of the resin will generaly take place. However if the non-volatile catalyst is a slow-acting catalyst, such as zinc nitrate, and this forms a high proportion of the catalyst mixture, there is a tendency for the physically stabilised resin to be much less cured than when using fast-acting catalysts. This may result in the shaped articles collapsing and fushing together during the curing operation. For this reason the amount of the non-volatile catalyst should be below 50% by weight of the volatile catalyst. Generally at least 10% by weight, based on the weight of the volatile acid catalyst, of the non-volatile catalyst is required to achieve a significant improvement in the degree, or rate, of curing.

We have found that by addition of the non-volatile catalyst not only is the degree, and/or rate, of curing increased, but also the amount of released formaldehyde is reduced even though the total amount of catalyst employed may be higher than when using a volatile catalyst alone.

The shaped articles are formed from a solution of the resin and catalysts in a suitable solvent. The solvent is preferably water, but alternatively may be any solvent which is relatively volatile at the temperatures to which the shaped articles are subjected after shaping.

The amino-formaldehyde resin employed is a condensate of an amino compound with formaldehyde. Some of the formaldehyde may be replaced by a higher aldehyde such as acetaldehyde. The amino compound is preferably a polyamine, particularly urea and/or melamine. In order that the resin is water soluble, so that water can be used as the solvent, the amino compound is preferably urea, alone or in admixture with up to 5% by weight of melamine. It is preferred that the molar ratio of aldehyde to amino groups is between 0.6:1 and 1.5:1, preferably beween 0.7:1 and 1.3:1.

In order to improve the processability of the resin solution it is often preferred to incorporate into the solution a small amount of a processing aid such as a thermoplastic polymer that is soluble in the solvent employed. Examples of suitable water soluble polymers that may be used include polyvinyl alcohol and polyethylene oxide. The amount of thermoplastic polymer used is preferably 0.01 to 5% by weight of the amino-formaldehyde resin solids. Where the shaped articles are fibres spun from the resin solution the addition of the processing, i.e. spinning, aid has an effect on the diameter of the fibres produced: if too little spinning aid is employed an undue amount of shot is liable to be produced. For economic reasons the amount of processing aid employed is preferably the minimum that is required to produce the desired product. The effectiveness of the thermoplastic polymer processing aid also depends on the molecular weight of the thermoplastic polymer. The lower the molecular weight the more processing aid that is required: where the shaped articles are fibres spun from the resin solution, the use of a thermoplastic polymer of too high molecular weight as the spinning aid may give rise to an unduly broad fibre diameter distribution. Thermoplastic polymers, such as polyethylene oxide, having a weight average molecular weight within the range 100,000 to 600,000 are particularly suitable.

Because the gel time of resin solutions containing the catalysts may be relatively short, even at ambient temperature, it is desirable to incorporate any fast-acting catalyst such as the aforesaid ammonium salts, including ammonium formate and acetate, into the resin solution just before the resin solution is formed into the desired articles. This is conveniently effected by mixing the resin solution with a solution containing the fast-acting catalysts. The resin solution generally has a much higher viscosity than the solution of the catalyst in the solvent. In order that the resin solution can be efficiently mixed with the catalyst solution it is preferred that the catalyst solution has its viscosity and elasticity increased by incorporation of at least part of the processing aid (which has the effect of increasing the viscosity). We have observed that the catalyst and resin solutions do not mix well in static in-line mixers unless at least some of the spinning aid has been added to the catalyst solution. For convenience it is preferred that all of the processing aid is included in the catalyst solution added to the resin solution.

With some catalyst combinations, particularly where the non-volatile acid salt catalyst is a metal salt, there is a risk that an insoluble salt will be formed by reaction of the non-volatile acid salt catalyst with the volatile acid catalyst. It has been found that such catalyst combinations may be successfully employed if the metal salt non-volatile acid catalyst is added to the resin solution whilst the solution of the volatile acid catalyst containing the spinning aid is added to, and mixed with, the resin/non-volatile catalyst solution, e.g. by an in-line mixer, just prior to spinning.

The present invention is of particular utility in the production of fibres. These may be made by the process described in our UK Patent Specification 1573116 wherein the catalysed resin solution, preferably containing a spinning aid, is fed to a rotating spinning cup and centrifugally spun therefrom as fibres.

The resin solids content of the spinning solution i.e. after admixture of the resin solution with the catalysts and spinning aid, is preferably at least 40% by weight and is generally below 65% by weight although higher resin solids contents, e.g. up to 75% by weight, may be used if elevated spinning cup temperatures are employed.

The spinning solution is fed to a rapidly rotating spinning cup. The cup is preferably a hollow vessel having one or more spinning surfaces and is preferably mounted for rotation about a substantially vertical axis. For example the cup may be open ended and the spinning surfaces comprise the ends of the open cup wall. Alternatively the cup wall may be provided with a plurality of spinning surfaces in the form of perforations.

The fibres spun from the cup into a gaseous environment in which they attenuate. This attenuation may be effected partially by inertia and partially by the effect of the flow of the gaseous environment. The fibres are preferably drawn out to a mean diameter of the order of 1 to 50 $\mu$m, particularly below 20 $\mu$m. The attenuated fibres are then contacted with a stream of hot air to dry and physically stabilise the fibres. The temperature and rate of flow of the hot air stream must be sufficient to dry the attenuated fibres to render them non-sticky. The temperature of the hot air is preferably in the range 100° to 350° C. Conveniently the hot air may simply be ambient air heated to the desired temperature without any drying step.

The shaped articles may be cured, as described hereinbefore, by heating, e.g. in an oven, at temperatures in the range 100° to 300° C. The curing temperature is preferably below 240° C. and in particular is in the range 130° to 220° C.

After curing the resin, the shaped article may be subjected to a water washing step. This is effective to remove some of the free formaldehyde and may also reduce the catalyst residues so that the released formaldehyde is also reduced.

Fibres produced by the process of the invention are of particular utility as thermal insulating materials. They are also of utility in paper manufacture either as the sole fibrous constituent or in admixture with cellulosic fibres, e.g. conventional mechanical or chemical pulp, or other synthetic fibrous materials, e.g. glass or polyolefin fibres. They may also be used in the production of non-woven structures particularly in combination with other fibres such as viscose rayon, polyester or polyolefin.

The invention is illustrated by the following examples in which all parts and percentages are expressed by weight.

In the Examples the released formaldehyde is measured by a method based on the AATCC test method 112, 1975. The cured sample is exposed to the ambient laboratory atmosphere for one hour to allow formaldehyde which was evolved during the curing process to dissipate. A 1.00±0.02 g sample is then accurately weighed and suspended over 50 ml of distilled water in a jar of volume 300 ml which is then sealed. The sample is not in contact with liquid water during the test but is saturated with the water vapour. The jar is stored at 30°±1° C. for 16 hours after which it is cooled to ambient temperature.

A 1 ml aliquot of the water is extracted and placed in a boiling tube followed by the addition of 4 ml of 15 N sulphuric acid, 1 ml 5% aqueous chromotropic acid and 5 ml of concentrated sulphuric acid, the contents of the tube being thoroughly mixed after each addition. The tube is then heated in a boiling water bath (100° C.) for 20 min. After cooling the mixture is diluted to 50 ml with distilled water. The optical density of the solution is then measured at 570 nm using a spectrophotometer. Whenever the optical density exceeded 1.0 the determination was repeated using a smaller aliquot, 0.2 ml, of the original aqueous extract.

The released formaldehyde (Fr) expressed as ppm on the original sample dry weight is given by:

$$Fr = fV/vw$$

where
f = formaldehyde content of test aliquot (μg)
V = total volume of distilled water (50 ml)
w = weight of dry sample (1.00±0.02 g)
v = volume of aqueous solution taken for analysis (usually 1 ml)

The formaldehyde content (f) of the test aliquot is determined for the measured optical density by means of a calibration graph prepared using standards of known formaldehyde content.

EXAMPLES 1-8 (Comparative)

A spinning solution was formed by mixing 6 parts of an aqueous solution, having a viscosity of 7.6 centipoise, containing 6.66% of a catalyst and 1.66% of a polyethylene oxide of weight average molecular weight 600,000 with 78 parts of an aqueous urea-formaldehyde resin solution having a formaldehyde:urea molar ratio of 2:1, a solids content of 65%, and a viscosity of 20 poise. Both viscosity measurements were made at 23° C. using a shear rate of 74.6 sec$^{-1}$. The catalyst content was thus 0.79% of the resin solids.

The spinning solution was centrifugally spun into an atmosphere at 70° C. by the process described in UK Patent Specification No. 1,573,116 into fibres using a perforated spinning cup of 12 cm diameter having 24 perforations of 3 mm width spaced around its perphery rotating at 4000 rpm. The total spinning solution feed rate to the cup was 84 g/min. Samples of the fibres, which had an average diameter of 12 μm were cured by heating in an oven for 30 min at 150° C.

The degree of cure and released formaldehyde were measured by the techniques hereinbefore described and are shown in the following table along with the nature of the catalyst.

| Example | Catalyst | Degree of Cure % | Released formaldehyde (ppm) |
|---|---|---|---|
| 1 | AS | 96.6 | 8827 |
| 2 | ADHP | 98.1 | 11454 |
| 3 | DAHP | 98.9 | 8893 |
| 4 | TAP | 98.8 | 6964 |
| 5 | AN | 99.2 | 8413 |
| 6 | MDHP | 96.9+ | 6690 |
| 7 | AF | 85.9+ | 4264 |
| 8 | AF* | 91.0+ | 4614 |

*1.58% used instead of 0.79%
+Sample fused on curing
AS = ammonium sulphate
ADHP = ammonium dihydrogen phosphate
DAHP = diammonium hydrogen phosphate
TAP = triammonium phosphate
AN = ammonium nitrate
MDHP = magnesium dihydrogen phosphate
AF = ammonium formate It is seen that while ammonium format gives much lower released formaldehyde figures, the degree of cure obtainable is much lower than with the other catalysts.

EXAMPLES 9-15

The above procedure was repeated using mixtures of ammonium formate (AF) and zinc nitrate (ZN) or ammonium nitrate (AN) as the catalyst.

The fibres were cured for various times at various temperature. The catalyst composition, degree of cure, and released formaldehyde (Fr) are set out in the following table, together with the correspoding data for Examples 5, 7 and 8.

| | Catalyst | | | Curing conditions | | | | | | | |
|---|---|---|---|---|---|---|---|---|---|---|---|
| | | | | 150° C./30 min | | 170° C./30 min | | 200° C./15 min | | 220° C./10 min | |
| EX | % AF | % ZN | % AN | Cure % | Fr ppm | Cure % | Fr ppm | Cure % | Fr ppm | Cure % | Fr ppm |
| 5 | 0 | 0 | 0.79 | 99.2 | 8413 | | | 99.5+ | 522 | 99.5+ | 501 |
| 7 | 0.79 | 0 | 0 | 85.9* | 4264 | | | 93.2* | 392 | 98.3* | 405 |
| 8 | 1.58 | 0 | 0 | 91.0* | 4614 | | | 98.6* | 327 | 97.3* | 200 |
| 9 | 1.58 | 0.13 | 0 | 91.8 | 3524 | | | 95.2 | 1155 | | |
| 10 | 1.58 | 0.26 | 0 | 94.5 | 3287 | 99.2 | 1290 | 97.8 | 696 | 98.2 | 524 |
| 11 | 1.58 | 0.39 | 0 | 95.8 | 2023 | 99.5 | 1536 | 98.6 | 526 | 98.8 | 326 |
| 12 | 1.58 | 0.65 | 0 | 96.3 | 1972 | | | 98.4 | 621 | 98.2 | 344 |
| 13 | 0.79 | 0.65 | 0 | 96.9 | 2796 | | | 98.6 | 557 | 98.6 | 684 |
| 14 | 1.58 | 0 | 0.26 | 93.2 | 3734 | | | 98.6 | 344 | 99.2 | 347 |
| 15 | 1.58 | 0 | 0.39 | 94.5 | 3131 | | | 98.7 | 493 | 98.7 | 433 |

*samples fused on curing
+samples yellowed during curing

By comparison with Examples 5, 7 and 8 is seen that the released formaldehyde may be markedly reduced and a higher degree of cure obtained, without fusion or yellowing of the fibres, by the use of the catalyst mixtures of the invention.

I claim:
1. A process for the production of fibers from amino-formaldehyde resins in which the fibers are formed from a solution of the resin and cured by heating to a temperature between 100° C. and 300° C., characterised in that the resin solution contains a catalyst mixture comprising 0.2 to 5% by weight, based on the resin solids, of ammonium formate and from 10 to 50% by weight, based on the weight of the ammonium formate, of a salt of a non-volatile acid selected from
- (i) an ammonium salt of an acid selected from sulphuric, phosphoric, and nitric acids, and
- (ii) a water soluble salt of a metal selected from zinc, magnesium, calcium, and aluminum and an acid selected from nitric, sulphuric, and phosphoric acids.

2. A process according to claim 1 wherein the amount of said ammonium formate is less than 2% by weight, based on the resin solids.

3. A process according to claim 1 or claim 2 wherein the amount of said salt of the non-volatile acid is at least 0.2% by weight of the resin solids.

4. A process according to claim 1 wherein said amino-formaldenhyde resin solution containing the catalysts is obtained by mixing a solution containing the amino-formaldehyde resin with a solution containing at least one of said catalysts and a water soluble thermoplastic polymer selected from polyvinyl alcohol and polyethylene oxide.

5. A process according to claim 4 wherein the salt of the non-volatile acid is a water soluble metal salt and is incorporated into the solution of the amino-formaldehyde resin prior to mixing the latter with the solution of the ammonium formate and water soluble polymer.

6. A process according to claim 1 wherein the amino-formaldehyde resin is cured by heating to temperatures in the range of 130° to 220° C.

7. A process according to claim 1 wherein the salt of the non-volatile acid is zinc nitrate.

8. A process according to claim 1 wherein the salt of the non-volatile acid is ammonium nitrate.

* * * * *